US007748418B2

(12) United States Patent
Johnson

(10) Patent No.: US 7,748,418 B2
(45) Date of Patent: Jul. 6, 2010

(54) WHEELED, FUEL HOSE LIFT

(76) Inventor: Bruce D. Johnson, Ww Safety Consultants, Inc., Federal Way, WA (US) 98093

( * ) Notice: Subject to any disclaimer, the term of this patent is extended or adjusted under 35 U.S.C. 154(b) by 795 days.

(21) Appl. No.: 11/648,790

(22) Filed: Jan. 3, 2007

(65) Prior Publication Data

US 2008/0006342 A1 Jan. 10, 2008

Related U.S. Application Data

(60) Provisional application No. 60/817,696, filed on Jul. 3, 2006.

(51) Int. Cl.
*B65B 1/04* (2006.01)
*B62B 1/00* (2006.01)

(52) U.S. Cl. ............................ 141/231; 141/1; 141/98; 222/526; 248/75; 294/16; 280/47.17

(58) Field of Classification Search .................... 141/1, 141/98, 231, 391; 222/526; 248/75, 76, 248/313; 294/16, 81.54; 135/65, 66, 77, 135/85

See application file for complete search history.

(56) References Cited

U.S. PATENT DOCUMENTS

| | | | | |
|---|---|---|---|---|
| 3,251,371 | A * | 5/1966 | Croker | 135/66 |
| 3,643,991 | A | 2/1972 | Eaton | |
| 3,739,424 | A | 6/1973 | Gonsalves et al. | |
| 4,248,453 | A * | 2/1981 | Stark | 280/655 |
| 4,887,835 | A * | 12/1989 | Dallaire et al. | 280/646 |
| 5,975,100 | A * | 11/1999 | Sfeir | 135/66 |
| 6,050,577 | A * | 4/2000 | Smith | 280/47.24 |
| 6,457,557 | B1 | 10/2002 | Anderson et al. | |
| 6,848,718 | B2 * | 2/2005 | Ravikumar et al. | 280/814 |
| 6,918,415 | B1 | 7/2005 | Johnson | |
| 7,188,859 | B2 * | 3/2007 | Hardin et al. | 280/652 |

* cited by examiner

*Primary Examiner*—Timothy L Maust
(74) *Attorney, Agent, or Firm*—Richard C. Litman

(57) ABSTRACT

A wheeled, fuel hose lift tool adapted to lift successive sections of a fuel hose to drain residual fuel from the hose as a user moves along the extended direction of the fuel hose. The tool includes a hose support wheel, an elongate, adjustable tube and a handle.

2 Claims, 4 Drawing Sheets

WHEELED, FUEL HOSE LIFT

CROSS-REFERENCE TO RELATED APPLICATION

This application claims the benefit of U.S. Provisional Patent Application Ser. No. 60/817,696, filed Jul. 3, 2006.

BACKGROUND OF THE INVENTION

1. Field of the Invention

The present invention generally relates to lifting tools. More specifically, the invention is drawn to a tool for lifting a fuel hose to progressively drain residual fuel from the hose.

2. Description of the Related Art

Service stations conventionally are provided with underground tanks for storing fuel. Fuel is pumped from tanker trucks to replenish the underground tanks. An elongate hose is employed to transfer the pumped fuel from the tanker truck to the underground storage tank. When the pumping operation is complete, the hose is returned to its storage niche on the truck. Unfortunately, some residual fuel usually remains in the hose and such remaining fuel would create a hazardous situation if the hose is not completely drained before being returned to its storage niche. Traditionally, to insure adequate drainage, the hose has been manually lifted in sections progressively from the truck to the surface entrance of the underground tank. Since a typical fuel hose is relatively heavy, this manual lifting procedure has been the cause of numerous back injuries resulting in down time and attendant economic loss.

An easy-to-use tool that would alleviate the bending and manual lifting would certainly be a welcome addition in the art. Thus a wheeled, fuel hose lift tool is desired.

The related art is rife with tools for lifting various objects. Samples of such related art are cited and identified in the accompanying IDS. However, none of the identified and cited inventions and patents, taken either singly or in combination, is seen to describe a wheeled, fuel hose lift as will subsequently be described and claimed in the instant application.

SUMMARY OF THE INVENTION

The present invention is an improvement over applicant's patent numbered U.S. Pat. No. 6,918,415 B1 issued Jul. 19, 2005. In use, the present invention includes a handle that is positioned over the fuel hose, which handle has a longitudinal axis parallel to the longitudinal axis of the extended fuel hose. This arrangement has proved to be more effective and efficient than the handle positioning disclosed in the above-cited patent. All metal parts are fabricated from aluminum to achieve weight reduction. Two mirror-image hubs are attached together to form the roller wheel. This allows for efficient maintenance if the roller wheel is damaged.

Accordingly, the invention presents a wheeled, fuel hose lift that is efficient, effective, light-weight and easy to maintain. The invention provides for improved elements thereof in an arrangement for the purposes described that are inexpensive, dependable and fully effective in accomplishing their intended purposes.

A clear understanding of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
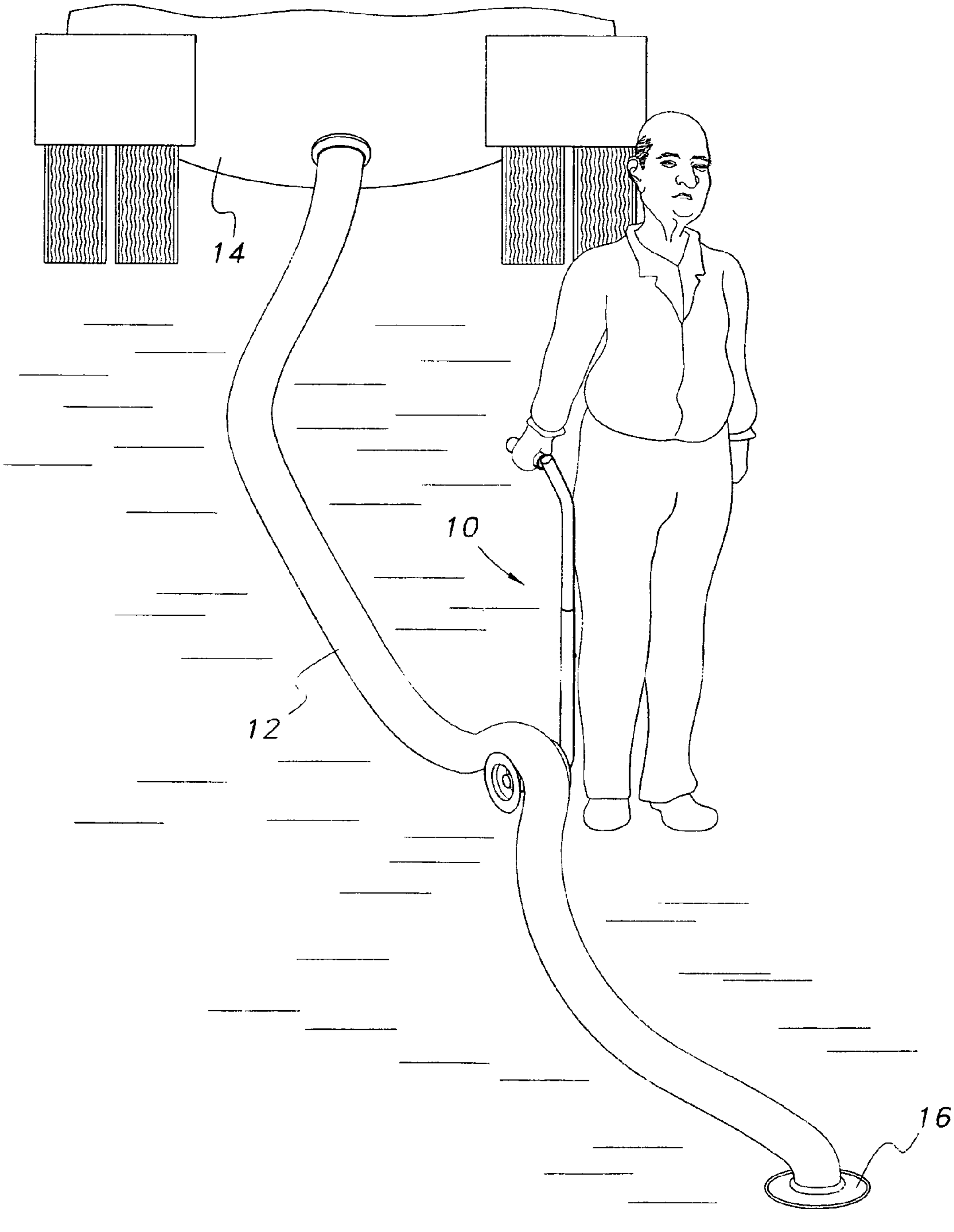
FIG. 1 is an environmental, perspective view of a wheeled, fuel hose lift according to the present invention.

Attention is first directed to FIG. 1, wherein the fuel hose lift of the present invention is generally indicated at 10. The lift 10 is positioned under a fuel hose 12 and is rolled from a position adjacent tanker truck 14 toward under ground tank opening 16 to lift successive sections of the hose to drain residual fuel from the hose. Note that the longitudinal axis of the handle of the lift is parallel to the extended direction of the hose.

Figure 2:
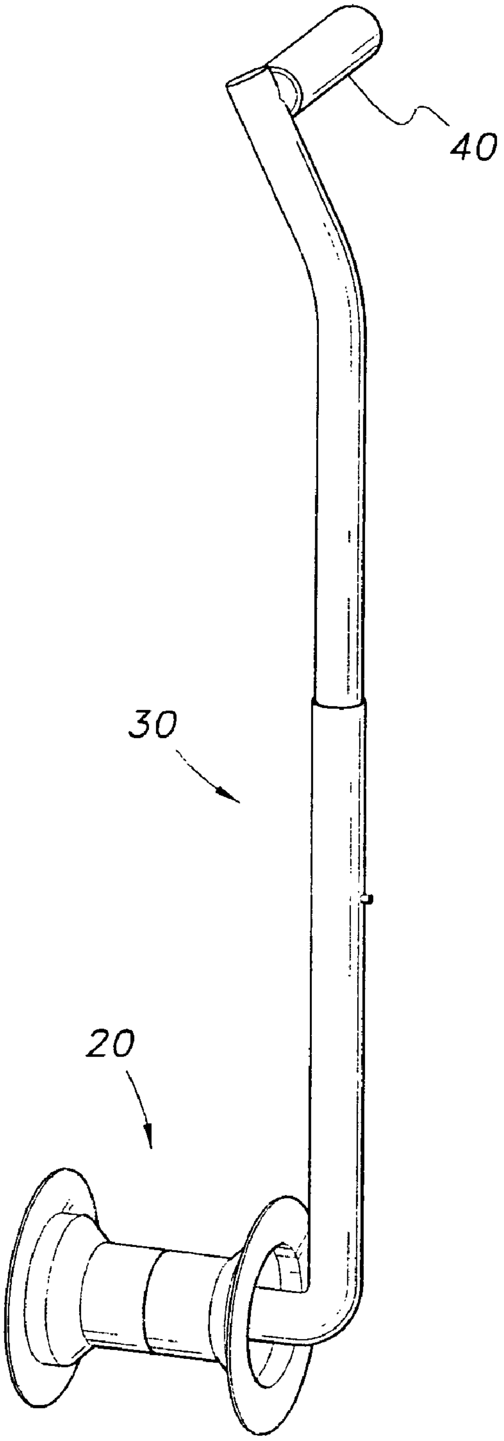
FIG. 2 is a perspective view of a wheeled, fuel hose lift according to the present invention.
Figure 3:
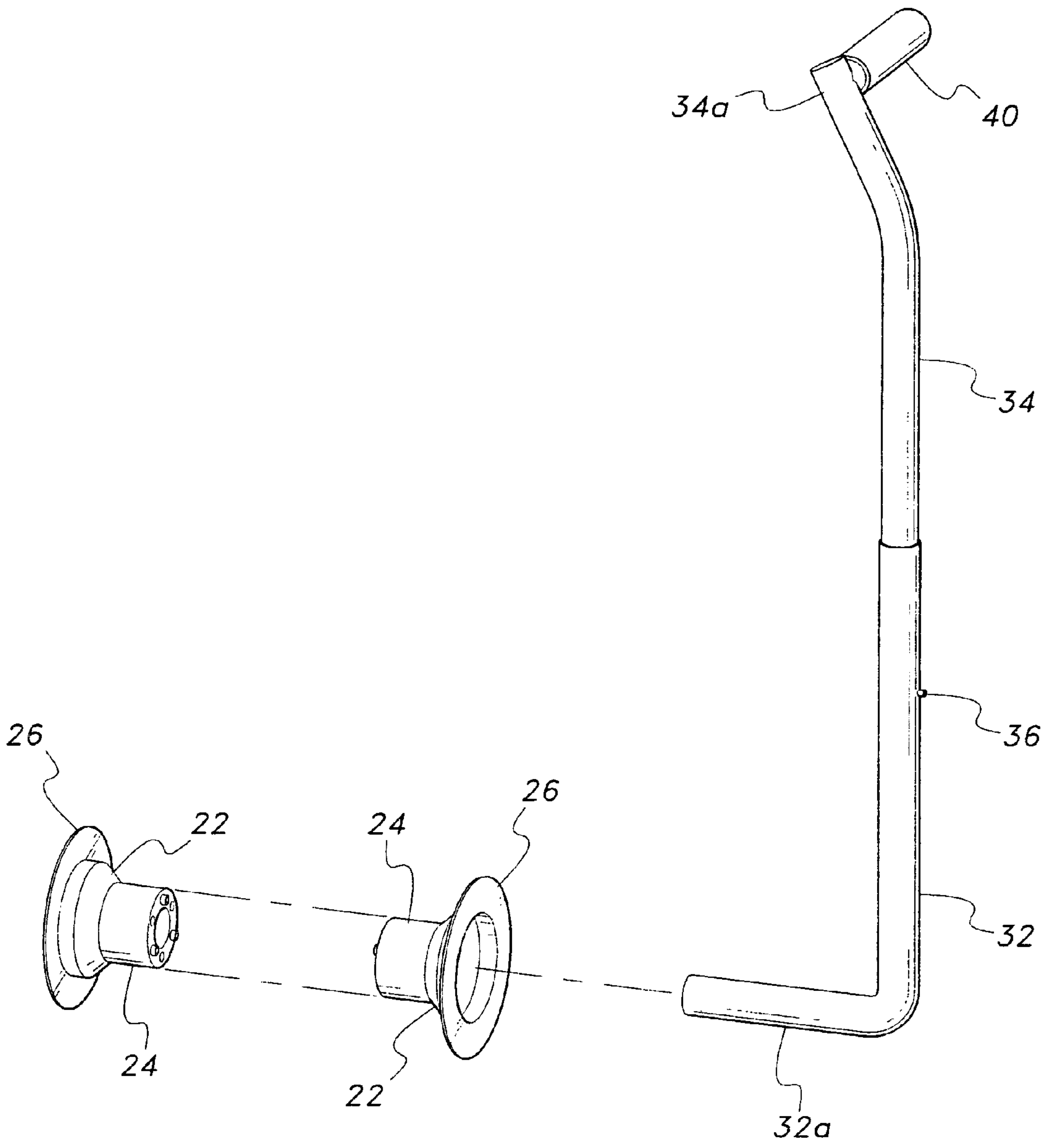
FIG. 3 is an exploded, perspective view of a wheeled, fuel hose lift according to the present invention.
Figure 4:
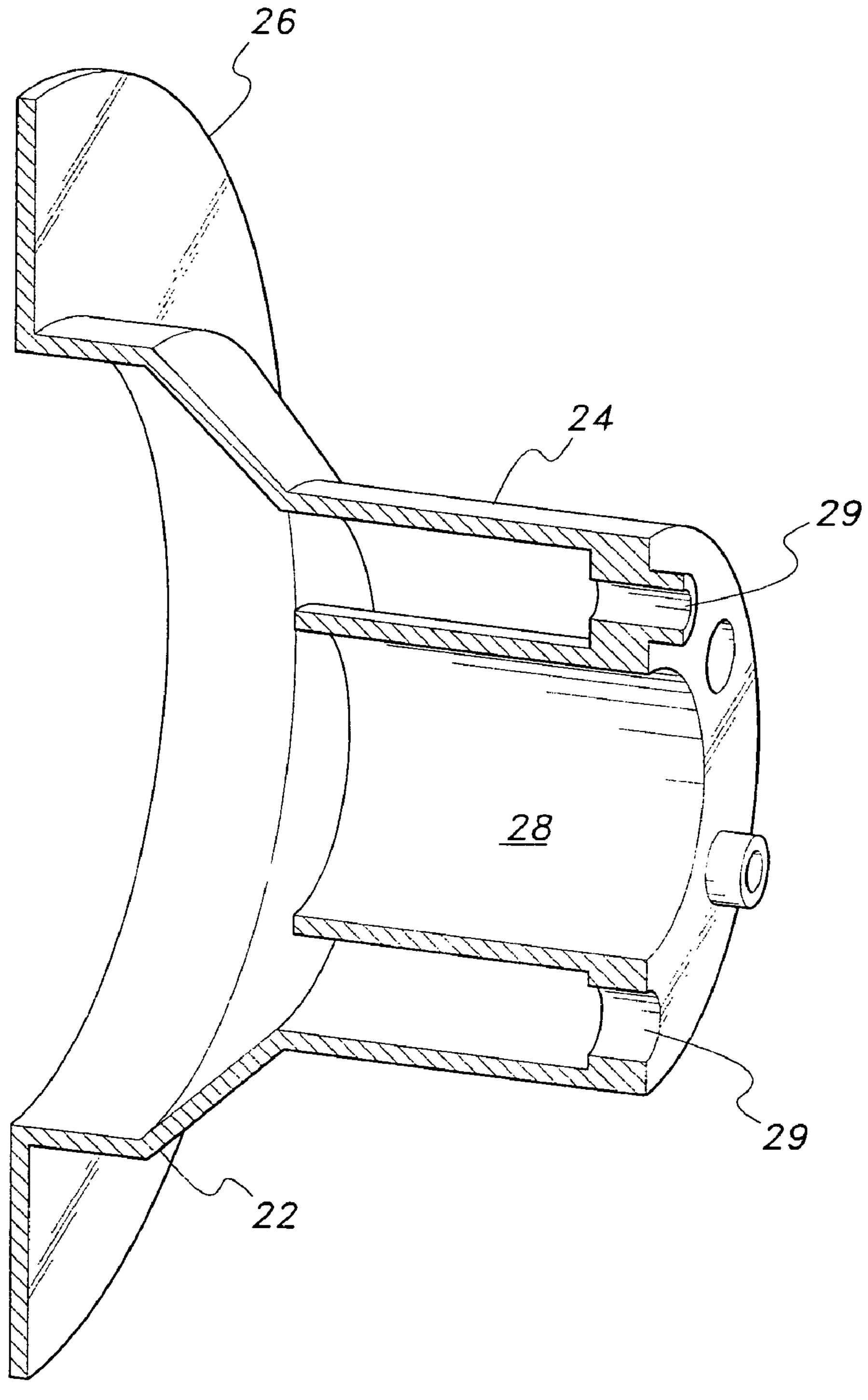
FIG. 4 is a sectional view of a roller hub of a wheeled, fuel hose lift according to the present invention.

As best illustrated in FIGS. 2 through 4, lift 10 consists of three main parts; a wheel 20, an elongate support tube 30 and a handle 40. Wheel 20 comprises identical hubs 22 having cylindrical hose engaging surfaces 24 and roller flanges 26. Each hub has a channel 28 extending therethrough for reasons as will be explained below. Openings 29 are utilized to attach the hubs together with conventional fasteners (screws, bolts, etc.). When attached, the hubs form a trough wherein surfaces 24 function to support a fuel hose 12 thereon. Elongate support tube 30 comprises adjustable telescoping tubes 32 and 34. Lower tube 32 is provided with an end 32*a* extending perpendicularly from tube 32. Upper tube 34 terminates in a free end 34*a* that is positioned at an obtuse angle from the vertical axis of tube 34. Each tube is fashioned with vertically spaced openings (not shown) for receiving a locking pin 36 therein to secure the tubes in a desired position as is well known in the art. When assembled, end 32*a* is adapted for insertion into channel 28 and functions as an axle for the wheel 20. Handle 40 is attached to end 34*a* and extends perpendicularly therefrom in a horizontal plane that is also perpendicular to a vertical plane extending from end 32*a*.

In use, the above-described positioning permits the longitudinal axis of the handle to be centered over and parallel to the extended direction of the fuel hose. As indicated above, this arrangement has been found to be more efficient and less taxing when the lift is rolled along under the hose to drain residual fuel therefrom.

It is to be understood that the present invention is not limited to the embodiment described above, but encompasses any and all embodiments within the scope of the following claims.

I claim:

1. A fuel hose lift, consisting essentially of:

a telescoping elongate tube, said telescoping elongate tube having an upper end and a lower end, the lower end including an end tube extending perpendicular to said elongate tube;

a fuel hose support wheel rotatably attached to said end tube of said elongate tube, wherein said fuel hose support wheel consists of a pair of identical hubs, each hub having a substantially continuous cylindrical hose-engaging surface, wherein each hub has a roller flange thereon;

openings formed in each of said identical hubs whereby said pair of identical hubs can be attached together;

a respective channel extending through each of said identical hubs, said end tube being disposed through each channel whereby said end tube is an axle for said support wheel; and a handle affixed to said upper end of said elongate tube, said handle having a longitudinal axis, the longitudinal axis of said handle extending in a horizontal plane that is perpendicular to the vertical planes extending from said axle and said elongate tube.

2. The fuel hose lift according to claim 1, wherein said fuel hose support wheel is fabricated from aluminum.

* * * * *